US008107760B2

(12) United States Patent
Hier

(10) Patent No.: US 8,107,760 B2
(45) Date of Patent: Jan. 31, 2012

(54) SYSTEMS AND METHODS FOR IMAGE ENHANCEMENT IN MULTIPLE DIMENSIONS

(75) Inventor: Richard G. Hier, Poway, CA (US)

(73) Assignee: Z Microsystems Visualization Technologies, LLC, San Diego, CA (US)

( * ) Notice: Subject to any disclaimer, the term of this patent is extended or adjusted under 35 U.S.C. 154(b) by 0 days.

(21) Appl. No.: 12/705,942

(22) Filed: Feb. 15, 2010

(65) Prior Publication Data

US 2010/0172596 A1    Jul. 8, 2010

Related U.S. Application Data

(63) Continuation of application No. 10/704,178, filed on Nov. 6, 2003, now Pat. No. 7,668,390.

(51) Int. Cl.
*G06K 9/40* (2006.01)
*G06K 9/36* (2006.01)
*G06K 9/32* (2006.01)
*H04N 5/14* (2006.01)
*H04N 9/64* (2006.01)
*G09G 5/02* (2006.01)
*G06T 5/00* (2006.01)

(52) U.S. Cl. ........ 382/264; 382/260; 382/276; 382/299; 348/571; 345/698

(58) Field of Classification Search ................. 382/300, 382/232, 260, 264, 276, 299; 348/571; 345/698
See application file for complete search history.

(56) References Cited

U.S. PATENT DOCUMENTS

| | | | | | |
|---|---|---|---|---|---|
| 5,164,899 | A | * | 11/1992 | Sobotka et al. | 704/9 |
| 5,574,572 | A | * | 11/1996 | Malinowski et al. | 358/451 |
| 5,774,599 | A | * | 6/1998 | Muka et al. | 382/254 |
| 5,910,908 | A | * | 6/1999 | Slavin | 708/313 |
| 6,009,447 | A | * | 12/1999 | Kubota et al. | 708/313 |
| 6,181,834 | B1 | * | 1/2001 | Li et al. | 382/298 |
| 6,937,772 | B2 | * | 8/2005 | Gindele | 382/240 |
| 6,993,207 | B1 | * | 1/2006 | Slavin | 382/298 |
| 7,742,198 | B2 | * | 6/2010 | Yada et al. | 358/474 |

* cited by examiner

*Primary Examiner* — Brian Q Le
*Assistant Examiner* — Jose M Torres
(74) *Attorney, Agent, or Firm* — Sheppard Mullin Richter & Hampton LLP

(57) ABSTRACT

A multi-dimensional data enhancement system uses large kernel filtering, decimation, and interpolation, in multi-dimensions to enhance the multi-dimensional data in real-time. The multi-dimensional data enhancement system is capable of performing large kernel processing in real-time because the required processing overhead is significantly reduced. The reduction in processing overhead is achieved through the use of low pass filtering and decimation that reduces the amount of data that needs to be processed in order to generate an unsharp mask comprising low spatial frequencies that can be used to process the data in a more natural way.

16 Claims, 15 Drawing Sheets

SYSTEMS AND METHODS FOR IMAGE ENHANCEMENT IN MULTIPLE DIMENSIONS

RELATED APPLICATION INFORMATION

This application claims priority under 35 U.S.C. 120 to U.S. Non-Provisional patent application Ser. No. 10/704,178, entitled "Systems and Methods for Image Enhancement in Multiple Dimensions" filed on Nov. 6, 2003, now issued U.S. Pat. No. 7,668,390, which is incorporated herein in its entirety.

BACKGROUND

1. Field of the Invention

The present invention relates to multi-dimensional data processing, and more particularly, to the enhancement of image data.

2. Background Information

Imaging systems play a varied and important role in many different applications. For example, medical imaging applications, such as endoscopy, fluoroscopy, X-ray, arthroscopy, and microsurgery applications are helping to save lives and improve health. Industrial applications, such as parts inspection systems that can detect microscopic errors on an assembly line, are leading to increased yields and efficiencies. A wide variety of military and law enforcement applications are taking advantage of imaging technology for target acquisition, surveillance, night vision, etc. Even consumer applications are taking advantage of advanced video imaging technology to produce heightened entertainment experience, such as the improved picture quality provided by High Definition Television (HDTV).

While there have been many advancements in video imaging technology, conventional video imaging systems can still suffer from deficiencies that impact the quality and usefulness of the video imagery produced. For example, video images generated with uncontrolled illumination often contain important, but subtle, low-contrast details that can be obscured from the viewer's perception by large dynamic range variations in the image. Any loss, or difficulty, in perceiving such low-contrast details can be detrimental in situations that require rapid responses to, or quick decisions based on, the images being presented.

A number of techniques have been applied to enhance video imagery. These techniques include image filtering applied in real-time. Conventional real-time filtering techniques can today be implemented as digital convolution over kernels comprising a relatively small number of image pixels, e.g., 3×3 pixel kernels, or 7×7 pixel kernels. These techniques can use high-pass filtering to emphasize details that are small relative to the size of the kernel being used. The improvement that can be achieved using such small kernels, however, is often limited. Studies have shown that significantly larger kernels are far more effective at achieving meaningful video enhancement. Unfortunately, the processing overhead required to perform large kernel convolution, in real-time, using conventional techniques, is prohibitive at the present state of digital signal processing technology.

SUMMARY

A multi-dimensional data enhancement system uses large kernel convolution techniques, in multi-dimensions, to improve image data in real-time. The multi-dimensional data enhancement system is capable of performing large kernel processing in real-time because the required processing overhead is significantly reduced. The reduction in processing overhead is achieved through the use of multi-dimensional filtering, decimation, and processing that reduces the amount of data that needs to be handled in certain stages of the operation, but still provides the same beneficial image enhancement.

In another aspect of the invention, the enhancement system can reduce the effect of pixels in surrounding image frames and the effect of blanking data on the processing of a pixel near the edge of an image frame by inserting fictional blanking data into the blanking areas.

These and other features, aspects, and embodiments of the invention are described below in the section entitled "Detailed Description of the Preferred Embodiments."

BRIEF DESCRIPTION OF THE DRAWINGS

Features, aspects, and embodiments of the inventions are described in conjunction with the attached drawings, in which.

DETAILED DESCRIPTION

The systems and methods described below are generally described in relation to a two dimensional video image system; however, it will be understood that the systems and methods described are not limited to applications involving video image systems nor to image processing systems comprising only two dimensions. For example, the filtering techniques described herein can also be used in data storage and data compression schemes.

Figure 1:
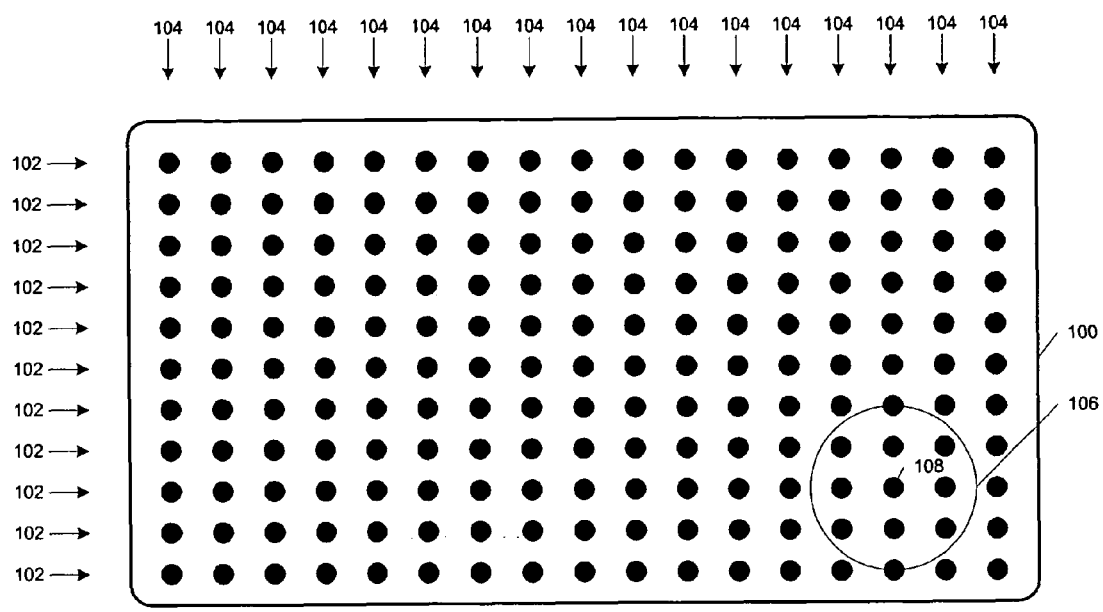
FIG. 1 is a diagram illustrating an exemplary display of image data.

FIG. 1 is a diagram illustrating an exemplary video image display 100. The image comprises a plurality of pixels arranged in rows 102 and columns 104. In most conventional, e.g., rasterized, video imaging systems, the pixels are scanned in both the horizontal and vertical dimensions.

It is often difficult to provide meaningful enhancement of video images in a conventional system. Real-time correction, or enhancement techniques do exist, but many such conventional techniques have used global approaches. In other words, all points of a given intensity on an input image must be mapped to the same corresponding output intensity. When applied correctly, such techniques can selectively help expand subtle details in some image areas; however, such approaches also often result in undesirable side effects, such as saturation of other broad bright or dark areas resulting in loss of detail in these areas. In order to provide enhancement and avoid some of the previously encountered drawbacks, relatively small kernel processing techniques have been used for non-global types of enhancement through a convolution process that generates a filtered output image from an input image, where each pixel in the output image results from considering the input image pixel values in an area surrounding the corresponding pixel, which area is defined by the kernel size.

In convolution processing, the values of input pixels in an area around (and including) a pixel of interest are each multiplied by a coefficient which is the corresponding element in the so-called "convolution kernel," and then these products are added to generate a filtered output value for the pixel of interest. The values of the coefficients assigned to the elements of the kernel can be configured so as to perform various types of filtering operations. For example, they can be configured such that the result of the convolution processing is a low pass filtered version, or an "unsharp mask", of the input data, and the structure of the kernel element values determines various filter characteristics, including the cut-off spatial frequency for the low pass filter operation being performed. In order to enhance the original image data, the unsharp mask can be subtracted from the original input data, which will produce a high pass version of the input data. The high pass version of the input data can then be amplified, or otherwise enhanced, and then can be recombined in various ways with the original and/or low pass data. The result can be an enhancement, or sharpening of the original image, by boosting spatial frequencies in the image that lie above the cut-off frequency.

Often, however, it is easier to define coefficients that accomplish the low pass filtering, amplification, and recombination of data in one step. Thus, simply passing the data through a single filtering step can generate enhanced data. But with present conventional digital signal processing technology, it is only really practical to directly apply such one step convolution filtering techniques to video images in real time using limited kernel size, i.e., a 3×3 pixel kernel or a 7×7 pixel kernel.

Real time convolution processing techniques require buffering of significant amounts of image data and considerably more processing overhead than global techniques. Thus, the buffering, and processing overhead requirements have limited conventional kernel—based approaches to relatively small kernel sizes. As mentioned above, however, small kernel operations produce limited enhancement, since they can only address a limited range of spatial frequencies within the image. Larger kernel operations can produce more beneficial enhancement by addressing more of the spectral content of images, but as explained above, the overhead required by large kernel sizes has traditionally proved prohibitive. As explained below, however, the systems and methods described herein can allow for large kernel sizes to be used to enhance video images in real-time, without the excessive overhead that plagues conventional systems. Moreover, the enhancement can be provided in multi-dimensional space, i.e., space with (N) dimensions, where N=2, 3, 4, . . . n.

Briefly, the systems and methods described herein take advantage of the fact that certain types of low pass filtering operations can be performed separably in multiple dimensions. Therefore, the data can be low passed filtered and decimated separately in each dimension to reduce the amount of such data being handled. The data can then be re-interpolated in each dimension to match the original input image sampling, then subtracted, amplified, and recombined with the original data in various ways to create an enhanced image that can be displayed.

Figure 2:
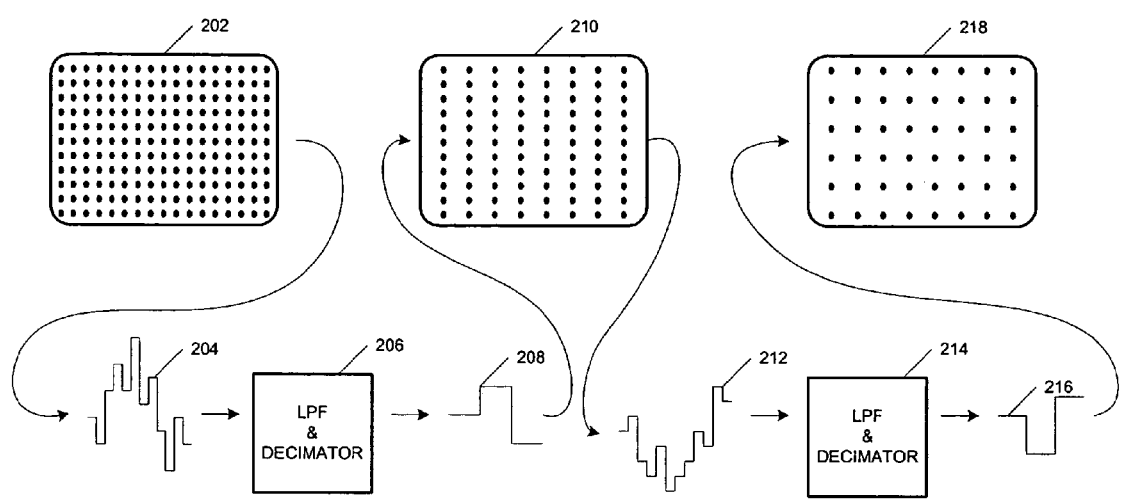
FIG. 2 is a diagram illustrating filtering, and decimation of image data in accordance with one embodiment of the invention.

Thus, as illustrated in FIG. 2, in a multi-dimensional data space, a low pass filter or a plurality of separable low pass filters can be implemented to decimate, or subsample, each of the N-dimensions in a successive order. The order is typically based on the scanning sequence associated with the data in the multi-dimensional data space. Examples of multi-dimensional data space can, for example, include two-dimensional video images in x and y dimensions. For a typical two-dimensional image that is scanned first in the horizontal direction and then in the vertical direction, decimation, or subsampling, can be performed in the same order as that of the scan, i.e., first in the horizontal direction and then in the vertical direction. The image data can be digital, analog, or mixed signal. For a typical two-dimensional digital video image, the pixel intensities can be represented as numbers in a two-dimensional data space.

In order for decimation, or sub-sampling, operations described herein to achieve the desired results of greatly easing the requirements of computing speed and data storage in subsequent dimensions, the low pass filtering of data within each dimension is preferably substantial, such that much of the high-frequency information is intentionally suppressed. In large-kernel low pass filtering operations on N-dimensional data sets, for example, all data except those at the very low frequencies are suppressed by using a low pass filter with a very low cut-off frequency. After the large-kernel low pass filtering and decimation operations, the data can then be interpolated and combined in various ways with the original data or the high frequency data using various types of algorithms to produce enhanced results.

Ordinarily, for correct alignment, the data containing the high spatial frequencies can be stored and delayed to match the filter delay inherent in the low pass filtering operation; however, in cases in which a sequence of similar images exist, the low frequency data can be stored and delayed by one field time minus the filter delay, and an "unsharp mask" of the data, which is low spatial frequency data from one frame, can be used as information for an approximate correction term to be applied to the next frame. This is because the accuracy required is not stringent in most cases due to the fact that the low pass filtered data by nature contains little or no detailed information which would otherwise require precise alignment.

Because of the very low frequency filtering in large kernel operations, the decimation or subsampling of data in each dimension can greatly reduce the need for computing speed and data storage in subsequent dimensions in the multi-dimensional data space. For example, for a two-dimensional video image, low pass filtering and decimation can be performed together for each dimension, first horizontally and then vertically. The decimation, or subsampling, in the horizontal direction can make real-time processing efficient by reducing the number of operations necessary to perform filtering in the subsequent dimension. Furthermore, the decimation, or sub-sampling in the vertical direction can greatly reduce the amount of storage space required for the low frequency data.

In general, the advantages of reduced requirements for data storage and computing power are more pronounced in data processing operations in a data space with a greater number of dimensions. For example, if low pass filtering results in a reduction of spectral content, and therefore data sampling requirements, by a factor of 10 in each dimension, the processing of data in an N-dimensional data space will result in a reduction of the required data storage and processing power by a factor of $10^N$.

For practical applications, because of the reduced requirements for processing power and data storage space, it is possible to combine different circuits for various functions, including, e.g., low pass filters, decimation or subsampling processors, and/or data storage memory, into a single device, such as an application specific integrated circuit (ASIC). Further, processor circuits for interpolation and other processing functions including, for example, various types of algorithms for enhancements, can also be integrated on the same ASIC.

In embodiments in which low frequency data is delayed while high frequency data is not, there is no need for any memory to store the high frequency data, such that the high frequency data can remain pristine with a high bandwidth. The high frequency data can even, depending on the implementation, remain in analog form and need not be sampled at all.

Returning to FIG. 2, a diagram is presented illustrating an example of filtering and decimation of a two-dimensional image that is scanned first horizontally and then vertically. The two-dimensional image can, for example, be a raster-scanned image in a traditional NTSC, or HDTV, system. It is assumed that the two-dimensional video image in FIG. 2 is scanned horizontally pixel by pixel from left to right and vertically line by line from top to bottom. In FIG. 2, an initial image 202 is scanned horizontally with pixel values represented by a curve 204 that is transmitted to a first low pass filter (LPF) and decimator 206, which generates a filtered and decimated output signal represented by a curve 208. The video image that has been filtered and decimated by the LPF and decimator 206 in the horizontal dimension is represented as a subsampled image 210, with a plurality of vertical columns of pixels that are spaced relatively far apart from one another. The pixel values of one of the columns of the image 210 can be represented by a signal curve 212, which is transmitted to a second LPF and decimator 214. The output signal of the second LPF and decimator 214 can be represented by a curve 216, which forms a further subsampled output image 218 after the processes of low pass filtering and decimation in both horizontal and vertical dimensions.

Figure 3:
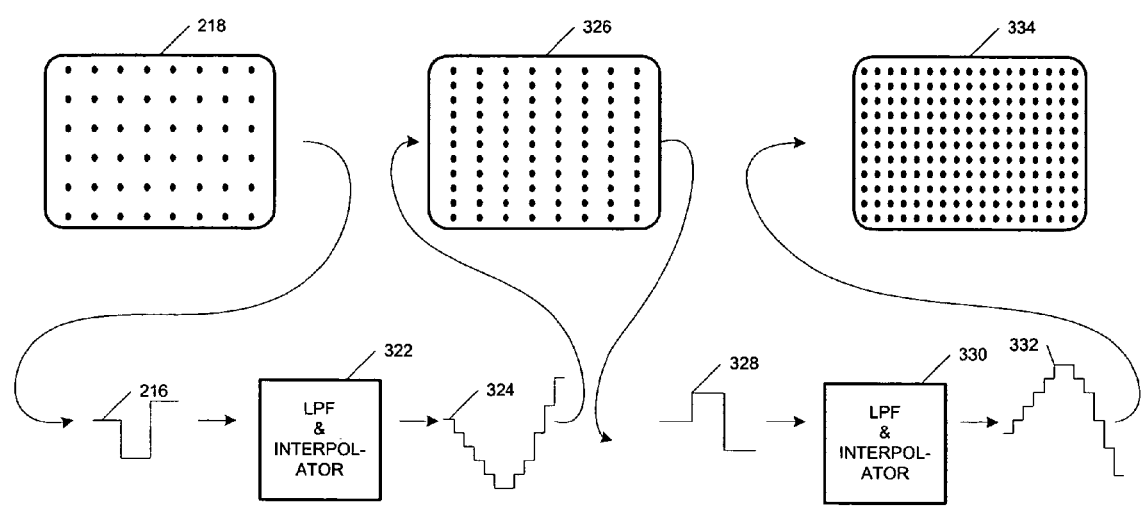
FIG. 3 is a diagram illustrating interpolation of the filtered and decimated image data of FIG. 2 in accordance with one embodiment of the invention.

FIG. 3 is a diagram illustrating an example interpolation of low pass filtered and decimated signals for constructing an unsharp mask in accordance with the systems and methods described herein. In FIG. 3, the subsampled image 218, which has been low pass filtered and decimated as illustrated in FIG. 2, with a signal curve 216, passes through a first interpolator with an optional low pass filter 322, column by column, to construct a signal curve 324. Signal curve 324 forms an intermediary image 326, which has a plurality of columns of pixels spaced relatively far apart from one another. In the horizontal direction, signal curve 328 as shown in FIG. 3, is transmitted to a second interpolator with an optional low pass filter 330 to construct a signal curve 332 in the horizontal direction. The signals which have been interpolated both vertically and horizontally form an output unsharp mask 334.

Figure 4:
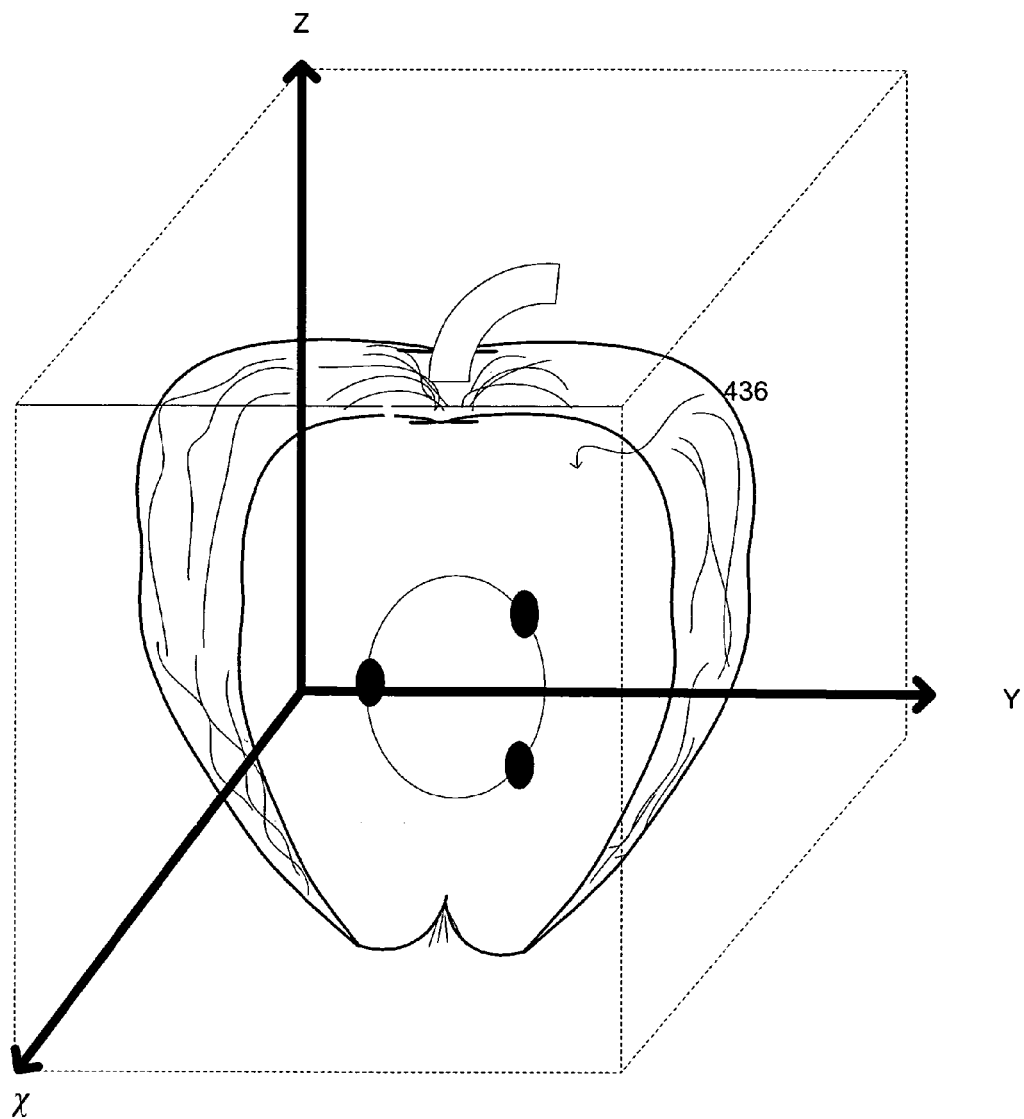
FIG. 4 is a diagram illustrating a 3-dimensional image that can be the subject of filtering, decimation, and interpolation similar to that of FIGS. 2 and 3.

The two-dimensional low pass filtering, decimation, and interpolation processes, as illustrated in FIGS. 2 and 3, can also be extended to data sets of three or more dimensions, such as a three-dimensional representation of an apple 436 as shown in FIG. 4. The pixels representing apple representation 436 can be scanned successively in x, y and z directions. The low pass filtering and decimation processes can then be performed with separable low pass filters and successive dimensional decimators in the same order as that of pixel scanning. The three-dimensional object, which in this case is apple 436, can be scanned in three dimensions with magnetic resonance imaging (MRI), for example. A three-dimensional data set is formed by sampling the density at each point in the three-dimensional space.

The filtering, decimation, and interpolation in subsequent dimensions of the n-dimensional space can be performed in parallel or in serial, depending on the embodiment. Parallel filtering operations have the added benefit that data does not need to be queued up, or buffered, as with serial operations. But serial operations typically require less resources, at least in hardware implementations.

Thus, using the systems and methods described in relation to FIGS. 2 and 3, large kernel filtering operations can be performed, providing greater enhancement than was previously possible, due to the fact that the data is decimated, which reduces the amount of data that needs to be stored and processed in subsequent operations. Unlike current conventional small kernel techniques, which perform low pass filtering and subtraction in one step, the systems and methods described herein perform the separable low pass filtering independently of the other steps, which allows the data to then be decimated enabling large kernel operations. Low pass filtering allows decimation, because you do not need as many data points to represent the low pass filtered, or low spatial frequency data. As a result, once the data is low pass filtered in the first dimension, the data can be decimated and subsequent operations in other dimensions can be performed on the reduced data set, which reduces storage and processing burdens.

Once the low pass filtered data is decimated, stored and then interpolated, producing unsharp mask 334, it can be recombined with the original data in such a manner as to produce enhanced data. For example, unsharp mask 334 can be subtracted from the original data. As mentioned above, an unsharp mask 334 produced from one frame can actually be used to enhance the next frame, since unsharp mask 334 comprises strictly low spatial frequency data. In other words, since unsharp mask 334 generally does not vary much from frame to frame, an unsharp mask produced from a previous frame can be used to enhance the image data in the next frame, except in extreme cases involving large hi-contrast image motion. Using this technique, the original data does not need to be slowed down, or buffered, while unsharp mask 334 is generated. Thus, the large kernel enhancement described herein can be performed in real time much more efficiently than would otherwise be possible. Moreover, in cases such as operation of equipment (e.g. performing surgery, flying a plane, etc.) while being guided by viewing video results, where even a single frame of delay of the image detail would be too great in hindering hand/eye coordination, this very strict real time behavior can be extremely important. Conversely, the input data can be slowed down to allow time for the generation of unsharp mask 334, so that both the full-bandwidth input data and the unsharp mask used for enhancement purposes can be from the same image frame, but this is often not preferable because of the increased storage requirements and/or the delay in image detail.

As mentioned above, the filtering, decimation, and interpolation process described herein can also be used in conjunction with data compression. For example, depending on the embodiment, the low frequency and high frequency data could be separated and transmitted separately, with the low frequency data being subsampled to save data storage space in a compression scheme, for example, and then recombined with the high frequency data to recover the original data set or image.

Figure 5:
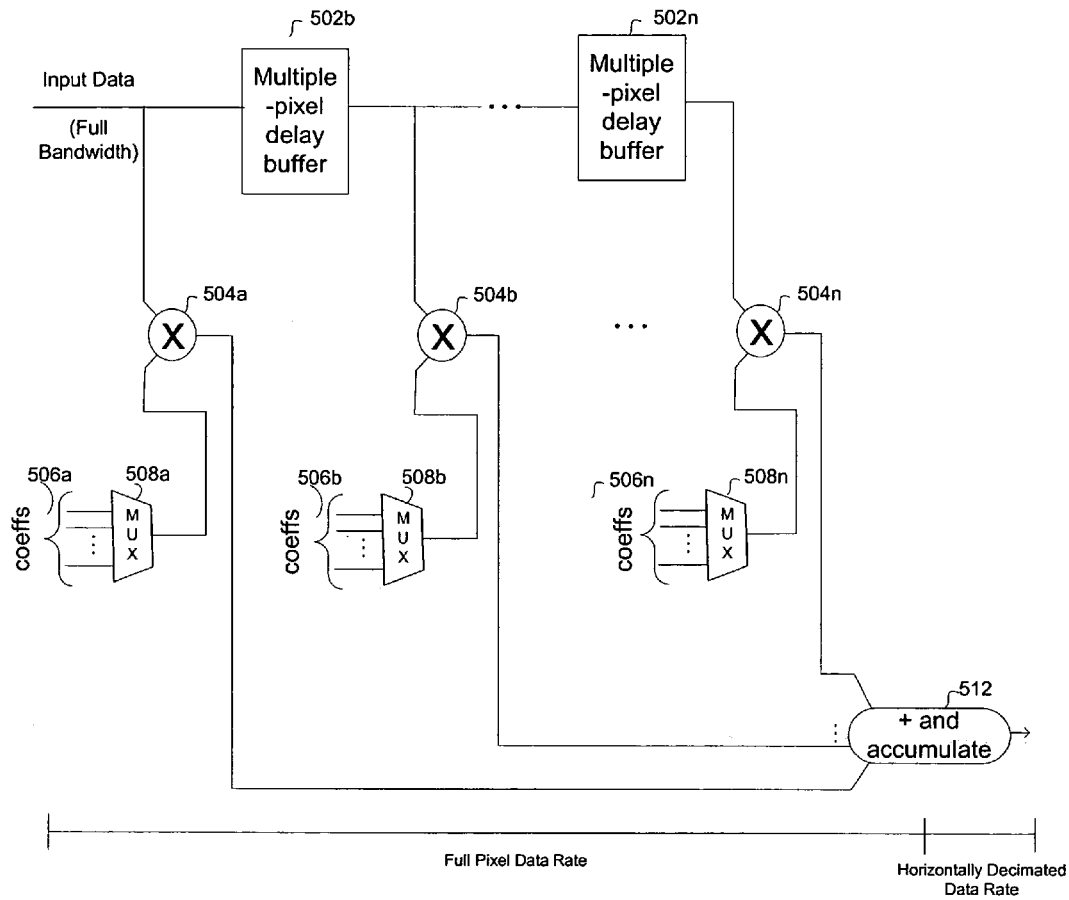
FIG. 5 is a diagram illustrating an example circuit for filtering and decimating image data in one dimension in accordance with one embodiment of the systems and methods described herein.
Figure 6:
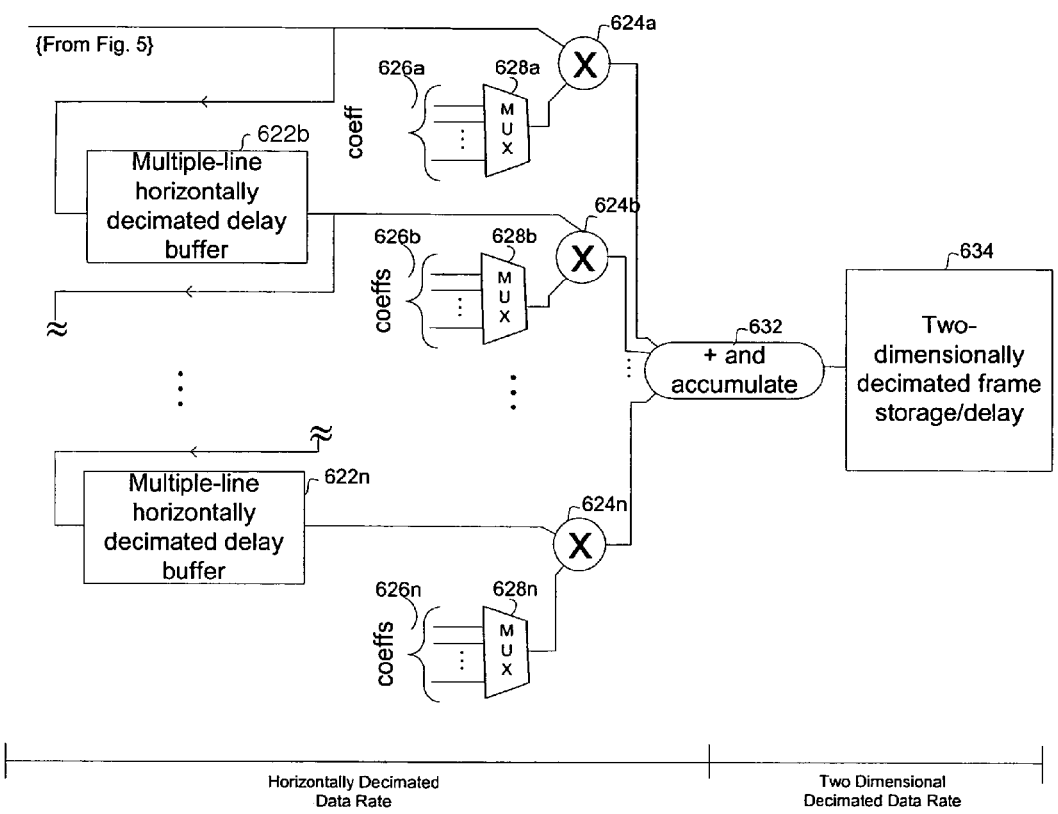
FIG. 6 is a diagram illustrating an example circuit for filtering and decimating the image data of FIG. 5 in a second dimension in accordance with one embodiment of the systems and methods described herein.

Example filtering circuits configured to implement the systems and methods described herein are described in detail in the following paragraphs. Thus, FIGS. 5-8 illustrate embodiments of low pass filtering with decimation and separable interpolation using polyphase Finite Impulse Response (FIR) filters for the filtering of two-dimensional data sets, for example, two-dimensional video images. FIGS. 5 and 6 form a block diagram illustrating separable low pass filtering and decimation in two dimensions, whereas FIGS. 7 and 8 form a block diagram illustrating interpolation in two dimensions using polyphase FIR filters. In FIG. 5, input data representing full-bandwidth video images can be passed to a series of multiple-pixel delay buffers beginning with buffer 502b and a string of multipliers beginning with multiplier 504a. As shown, a set of selectable filter coefficients 506a can be provided for selection by a coefficient multiplexer 508a. The coefficient selected by coefficient multiplexer 508a can then be transmitted to multiplier 504a for multiplication with the full-bandwidth input data. The result of the multiplication can then be passed from the output of multiplier 504a to an adder and accumulator 512.

The full-bandwidth data delayed by multiple-pixel delay buffer 502b, can then be passed to a second multiplier 504b. A second set of filter coefficients 506b can then be provided for selection by a second coefficient multiplexer 508b. The selected coefficient can be passed to second multiplier 504b for multiplication with the full-bandwidth input data, which has been delayed by multiple-pixel delay buffer 502b. A plurality of such multiple-pixel delay buffers 502b, 502c (not shown), . . . 502n as well as a plurality of multipliers 504a, 504b, 504c (not shown), . . . 504n, and a plurality of selectable coefficient multiplexers 508a, 508b, 508c (not shown), . . . 508n can be connected to form a polyphase FIR filter in accordance with the systems and methods described herein.

It should be noted that the selection of coefficients 506a, 506b, . . . 506n, can be controlled by a processor (not shown) interfaced with the polyphase FIR filter of FIG. 5. In certain embodiments, the coefficients are simply loaded by the processor initially and then the processor is not involved. The number of coefficients is equal to the number of elements in each delay buffer 502b-502n. As each new pixel is processed, a new coefficient 506a is selected. For example, the first of coefficients 506a can be selected when a first pixel is being processed, the second of coefficients 506a can be selected when the next pixel is being processed, and so on until the process loops back and the first of coefficients 506a is selected again.

Thus, for example, if the decimation in FIG. 2 is 4-to-1, i.e., for every four pixels in data set 202, there is one pixel in data set 210, then there would be four elements in each of the delay buffers 502b-502n and four distinct coefficients in set 506a. Similarly, there will be four coefficients in each set 506b-506n.

The results of multiplication by multipliers 504a, 504b, 504c (not shown), . . . 504n are passed to adder and accumulator 512, which can be configured to generate horizontally decimated image data for decimation in a second dimension, e.g., by another polyphase FIR filter, such as the one illustrated in FIG. 6. The full-bandwidth input data can be sent to successive multiple-pixel delay buffers 502b, . . . 502n and multipliers 504a, 504b, . . . 504n at the full-pixel data rate, i.e., the rate at which the pixels, of a video image are scanned. The data transmitted from adder and accumulator 512 can, however, be at a horizontally decimated data rate, which can be a much lower data rate than the full-pixel data rate. As a result, the overhead required for subsequent operations can be reduced.

FIG. 6 is a block diagram illustrating a polyphase FIR filter configured to decimate data sets in a second dimension after the data sets, or video images, have been decimated in a first dimension, e.g., by the polyphase FIR filter of FIG. 5, in accordance with one embodiment of the systems and methods described herein. For example, two-dimensional video images scanned first in the horizontal direction and then in the vertical direction, can be first decimated horizontally by the polyphase FIR filter of FIG. 5 and then decimated vertically by the polyphase FIR filter of FIG. 6.

Referring to FIG. 6, the output data from adder and accumulator 512 can be passed to a multiple-line horizontally decimated delay buffer 622a and a multiplier 624a. Selectable filter coefficients 626a can then be provided for selection by a coefficient multiplexer 628a. The selected coefficient can then be multiplied with the horizontally decimated data by first multiplier 624a to generate an output that is transmitted to an adder an accumulator 632.

The horizontally decimated input data which has passed through the first multiple-line horizontally decimated delay buffer 622a can then be passed to a second multiplier 624b. A second set of selectable filter coefficients 626b can be provided for selection by a second coefficient multiplexer 628b. Second multiplier 624b can multiply the coefficient selected by multiplexer 628b with the data that has been delayed by first multiple-line horizontally decimated delay buffer 622a.

The result of multiplication by second multiplier 624b can then be passed from the output of second multiplier 624b to adder and accumulator 632. After a series of successive delays of horizontally decimated data, the last multiple-line horizontally decimated delay buffer 622n can be configured to transmit the delayed data to a last multiplier 624n. A set of selectable filter coefficients 626n can be provided for selection by a last coefficient multiplexer 628n, which can transmit the selected coefficient to multiplier 624n for multiplication with the data delayed by last delay buffer 622n. The result of the multiplication can then be transmitted from multiplier 624n to adder and accumulator 632.

In the embodiment shown in FIG. 6, the horizontally decimated input data are transmitted through a successive chain of multiple-line horizontally decimated delay buffers 622b, 622c (not shown), . . . 622n for multiplication with respective filter coefficients selected by respective multiplexers. The results of multiplication by multipliers 624a, 624b, 624c (not shown), . . . 624n can be passed to adder and accumulator 632, which can be configured to generate the result of horizontal decimation. The results generated by adder and accumulator 632 can be stored in a two-dimensionally decimated frame storage and delay buffer 634 for further processing. The data received from the polyphase FIR filter of FIG. 5 can be passed through multiple-line horizontally decimated delay buffers 622b, . . . 622n and the multipliers 624a, 624b, . . . 624n at the horizontally decimated data rate, whereas the data transmitted from adder and accumulator 632 to two-dimensionally decimated frame storage and delay buffer 634 can be transmitted at a two-dimensionally decimated data rate, which can be a much lower data rate than the horizontally decimated data rate.

Figure 7:
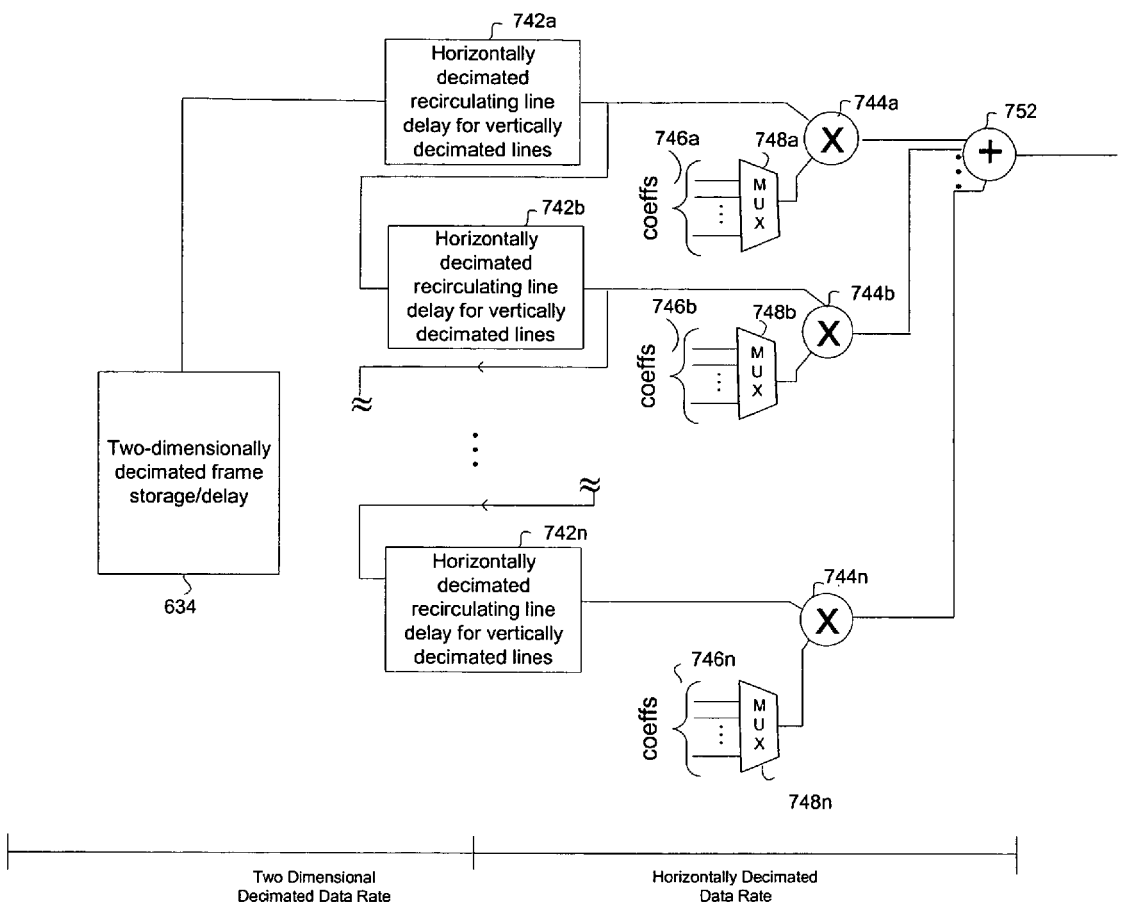
FIG. 7 is a diagram illustrating an example circuit for interpolating the image data of FIGS. 5 and 6 in one dimension in accordance with one embodiment of the systems and methods described herein.

FIG. 7 is a block diagram illustrating a polyphase FIR filter for interpolation in the vertical dimension of data which have been decimated in both the horizontal and vertical dimensions by the polyphase FIR filters of FIGS. 5 and 6. In the embodiment of FIG. 7, two-dimensionally decimated frame storage and delay buffer 634 transmits the decimated data to a first horizontally decimated recirculating line delay 742a for vertically decimated lines. Horizontally decimated recirculating line delay 742a outputs temporally delayed data to a first multiplier 744a and to a second horizontally decimated recirculating line delay 742b for the vertically decimated lines.

A first set of selectable filter coefficients 746a can be provided for selection by a first coefficient multiplexer 748a, which can be configured to select a first coefficient for multiplication with the delayed data received from horizontally decimated recirculating line delay 742a. First multiplier 744a can be configured to multiply the first coefficient with the temporally delayed input data to produce a result which is transmitted from the output of the first multiplier 744a to an adder 752.

Similarly, a second set of selectable filter coefficients 746b can be provided for selection by a second coefficient multiplexer 748b, which can be configured to select a coefficient from the second set of coefficients for multiplication with twice delayed input data by a second multiplier 744b. Multiplier 744b multiplies the selected coefficient with the decimated input data that has been passed through the first two horizontally decimated recirculating line delays 742a and 742b for vertically decimated lines, to produce a result at the output of the second multiplier 744b.

Thus, the two-dimensionally decimated data can pass through a plurality of horizontally decimated recirculating line delays 742a, 742b, . . . until it reaches the last horizontally decimated recirculating line delay 742n. At which point, a set of selectable filter coefficients 746n can be provided for selection by a coefficient multiplexer 748n, which can be configured to select a coefficient from the set of selectable coefficients 742n for multiplication by the multiplier 744n. Multiplier 744n can be configured to multiply the coefficient with two-dimensionally decimated data that has passed through the series of horizontally decimated recirculating line delays 742a, 742b, . . . 742n, to generate a result at the output of the multiplier 744n.

Adder 752, which is connected to the outputs of multipliers 744a, 744b, . . . 744n, respectively, can be configured to then calculate the resulting limited spectral content data that has been reconstructed by interpolation in the vertical dimension.

In the embodiment of FIG. 7, the two-dimensionally decimated image data is transmitted at a two-dimensionally decimated data rate from the frame storage and delay buffer 634 to the series of horizontally decimated recirculating line delays 742a, 742b, . . . 742n for the vertically decimated lines. In contrast, the data that has been vertically interpolated by multipliers 744a, 744b, . . . 744n and adder 752 can be transmitted at a horizontally decimated data rate that is a higher data rate than the two dimensionally decimated data rate. The vertically interpolated data generated at the output of adder 752 can then be transmitted to the polyphase FIR filter of FIG. 8 for horizontal interpolation.

Figure 8:
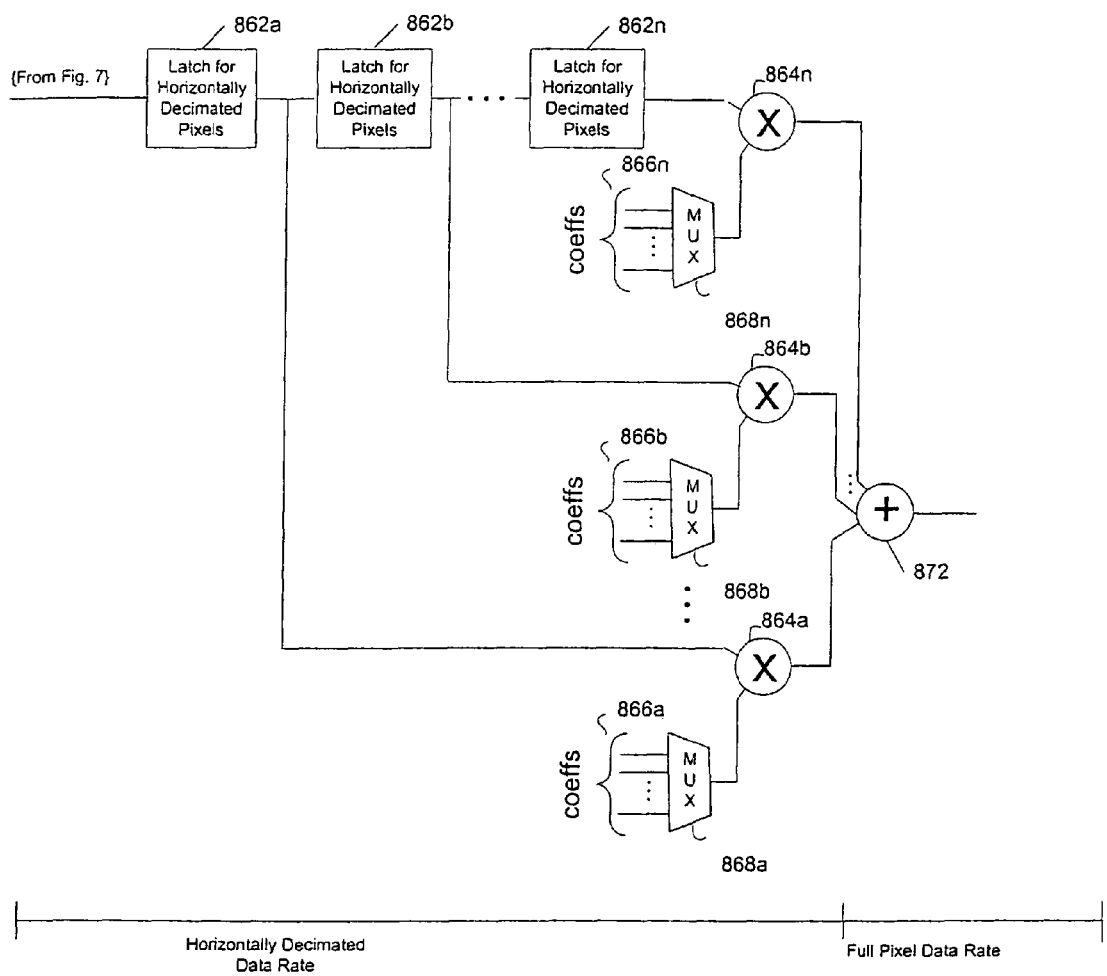
FIG. 8 is a diagram illustrating an example circuit for interpolating the image data of FIG. 7 in a second dimension in accordance with one embodiment of the systems and methods described herein.

FIG. 8 is a block diagram illustrating a polyphase FIR filter configured for horizontal interpolation of the horizontally decimated data generated by the FIR filter of FIG. 7 to produce output video data at full data rate, but with reduced spectral content, in accordance with one example embodiment of the systems and methods described herein. As shown in the embodiment of FIG. 8, the horizontally decimated data received from the output of the polyphase FIR filter of FIG. 7 can be transmitted to a first latch 862a for horizontally decimated pixels, which in turn can be configured to transmit the temporally delayed data to a second latch 862b and to a first multiplier 864a.

A set of selectable filter coefficients 866a can then be provided for selection by a coefficient multiplexer 868a. Coefficient multiplexer 868a can be configured to output the selected coefficient to a multiplier 864a that can be configured to multiply the coefficient with the temporally delayed data that has passed through latch 862a, to produce a result at the output of multiplier 864a. Again the coefficients can be loaded by a processor (not shown) and then selected as each pixel is processed.

Similarly, a second set of selectable filter coefficients 866b can be provided for selection by a second coefficient multiplexer 868b, which can be configured to select a coefficient from the second set of coefficients for multiplication by a second multiplier 864b. Multiplier 864b can be configured to multiply the coefficient with the data that has passed through the first two latches 862a and 862b to generate a result at the output of the second multiplier 864b.

The input data that has passed through the series of latches 862a, 862b, . . . 862n for the horizontally decimated pixels can then be transmitted to a final coefficient multiplier 864n. At which point, a set of selectable filter coefficients 866n can be provided for selection by a coefficient multiplexer 868n, which can be configured to select a coefficient from the set of coefficients 866n for multiplication with the temporally delayed data that has passed through the series of latches 862a, 862b, . . . 862n. Multiplier 864n generates a result at the output of multiplier 864n.

An adder 872 can be interfaced with the outputs of respective multipliers 864a, 864b, . . . 864n to produce vertically and horizontally interpolated output data with a reduced spectral content at the output of adder 872.

Thus, in the embodiment shown in FIG. 8, the vertically interpolated input data can be transmitted to the series of latches 862*a*, 862*b*, . . . 862*n* for the horizontally decimated pixels at the horizontally decimated data rate, whereas the output data resulting from interpolation by multipliers 864*a*, 864*b*, . . . 864*n* and adder 872 can be transmitted at a full-pixel data rate, which can be the same rate at which the full-bandwidth input data is transmitted to the polyphase FIR filter for horizontal decimation illustrated in FIG. 5. The resulting output from the polyphase FIR filter of FIG. 8 can, however, be at full sample rate, but comprise less spectral content, because it is a two-dimensionally low pass filtered version of the input data. The output data from the polyphase FIR filter of FIG. 8 can, therefore, be used as low pass filter data for video enhancement algorithms to produce various enhancement effects.

Although embodiments have been described with respect to specific exaples of two-dimensional separable low pass filtering, decimation, and interpolation using polyphase FIR filters, the systems and methods described herein should not be seen as limited to such specific implementations. For example, three-dimensional images and other types of multi-dimensional data sets with two or more dimensions can also be processed according to the systems and methods described herein. Furthermore, other types of filters such as IIR filters can also be used for low pass filtering, decimation, and interpolation operations as required by a specific implementation.

The output of the filtering, decimation, and interpolation systems illustrated in FIGS. 2 and 3 can be referred to as an unsharp mask of the input data. Different kernel sizes, i.e., numbers of coefficients, will result in different unsharp masks. Thus, a plurality of unsharp masks can be predefined for a given system, e.g., an HDTV system, and the user can be allowed to select the high spatial frequency enhancement with different spatial frequency cutoffs by selecting which of the plurality of unsharp masks should be applied to the input data for the system.

Figure 9:
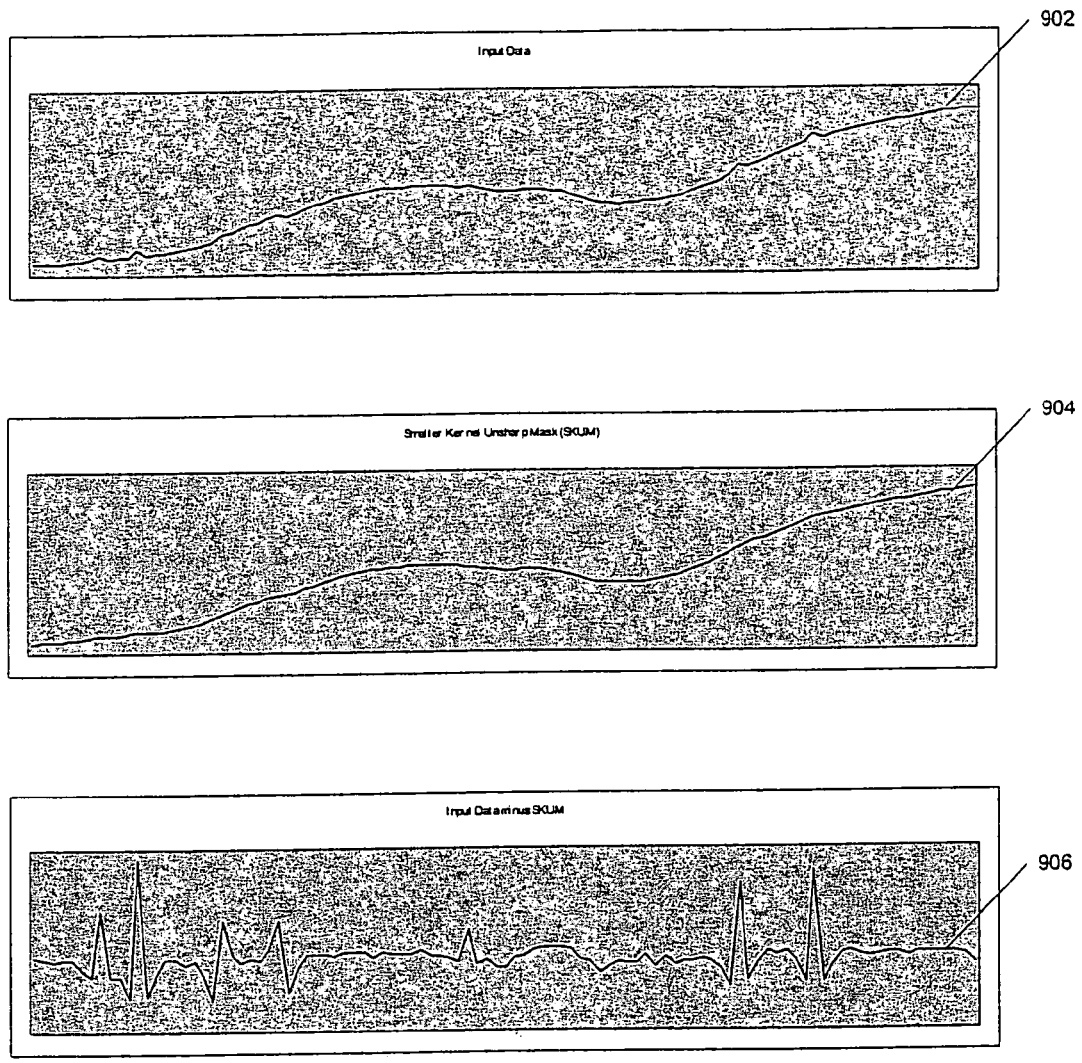
FIG. 9 is a diagram illustrating the application of a relatively small kernel filter to input data in order to generate an unsharp mask that can be used to generate an enhanced version of the input data in accordance with one embodiment of the systems and methods described herein.

For example, FIG. 9 illustrates the application of a relatively smaller kernel to the input data of curve 902. It should be kept in mind that FIG. 9 can still depict a larger kernel operation than is typically possible using traditional techniques. Thus, when the large kernel processing described above is applied to the input data represented by curve 902, unsharp mask 904 is generated. As can be seen, the high frequency spectral content of curve 902 is suppressed in curve 904, due to the low pass filtering operation. Unsharp mask 904 can then be subtracted from input data 902, which will leave the high frequency content of input data 902. The high frequency version can then be amplified to produce a curve 906. The high frequency data of curve 906 can then, for example, be recombined with input curve 902 to produce an enhanced version of the input data.

Figure 10:
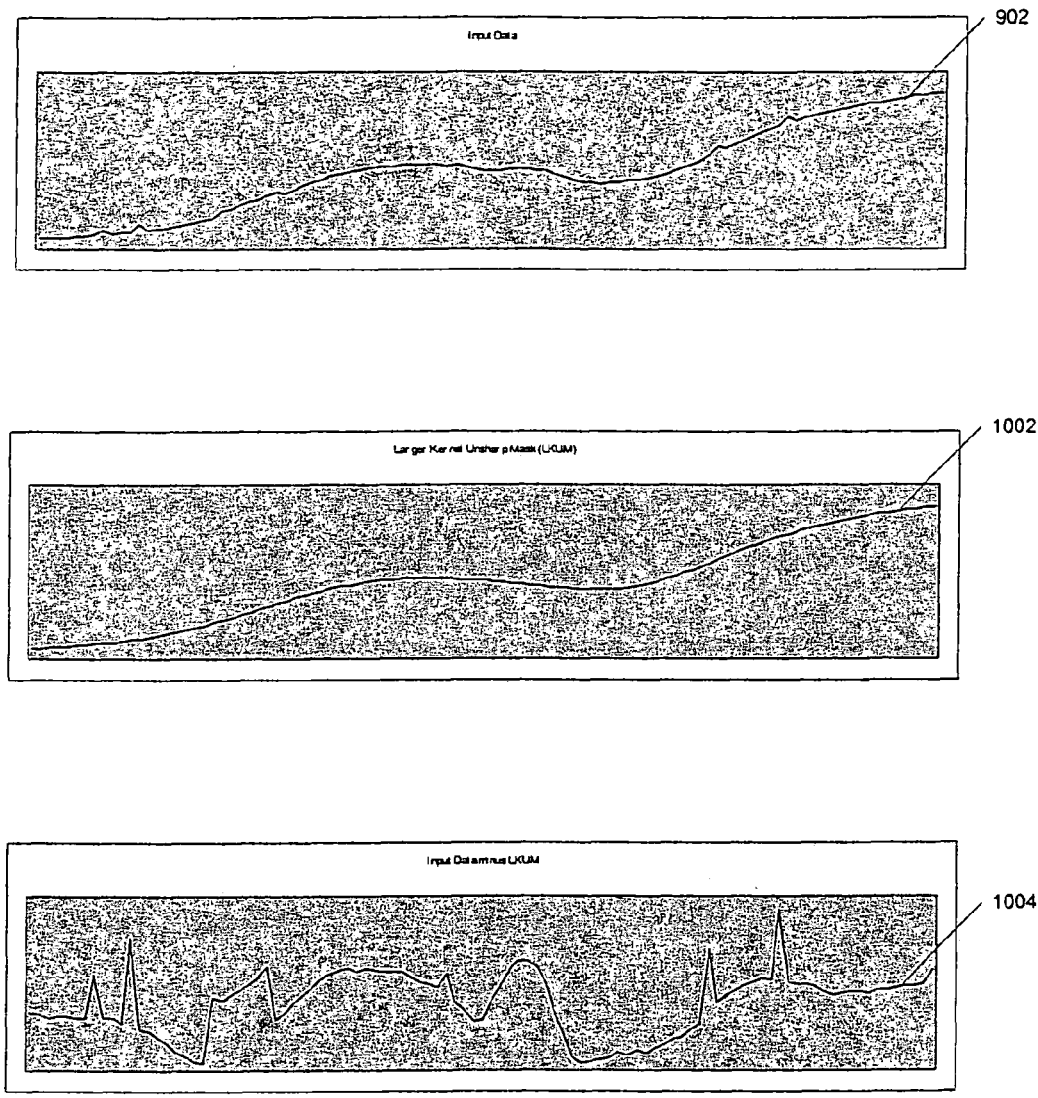
FIG. 10 is a diagram illustrating the application of a larger kernel filter to input data in order to generate an even smoother unsharp mask that can be used to generate an enhanced version of the input data in accordance with one embodiment of the systems and methods described herein.

If an even larger kernel is used, however, then even more lower frequency data will be suppressed in the resulting unsharp mask as illustrated in FIG. 10. Thus, from the same input curve 902, an even smoother unsharp mask 1002 can be generated using a larger kernel than that used to produce unsharp mask 904. A high frequency version 1004 can again be generated through subtraction and amplification, but curve 1004 will include even more middle and high frequency spectral content. High frequency version 1004 can then, for example, be combined with input data of curve 902 to generate an enhanced version of the input data.

Using different kernel sizes simultaneously, a plurality of unsharp masks can be applied and combined to produce different frequency bands in a manner similar to the filtering and combining of frequency bands by graphic equalizers in typical audio applications. Thus, a video graphic equalizer can be created using a plurality of unsharp masks such as those illustrated in FIGS. 9 and 10 in a manner analogous to an audio graphic equalizer. As described below an N-dimensional bandpass function, and other unsharp masks with other cut-off frequencies and corresponding kernel, sizes can be combined to produce other passbands, each of which can be further manipulated for various effects and purposes. In a video graphic equalizer configured in accordance with the systems and methods described herein, a contiguous, nearly non-overlapping set of bands can be produced to manipulate the gain of each band independently.

Figure 11A:
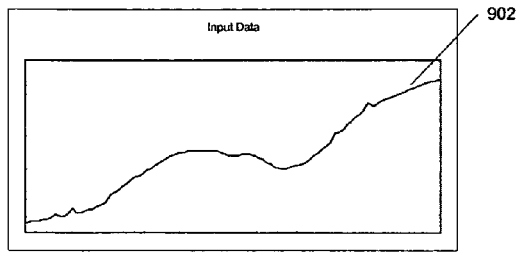
FIG. 11A is a diagram illustrating a curve representing input image data.
Figure 11B:
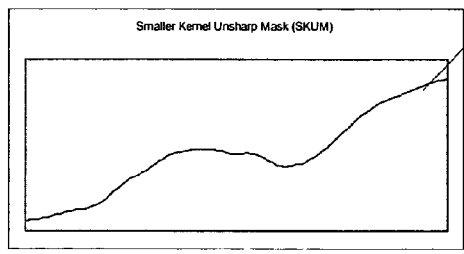
FIG. 11B is a diagram illustrating a curve representing an unsharp mask generated from the image data of FIG. 11A.
Figure 11D:
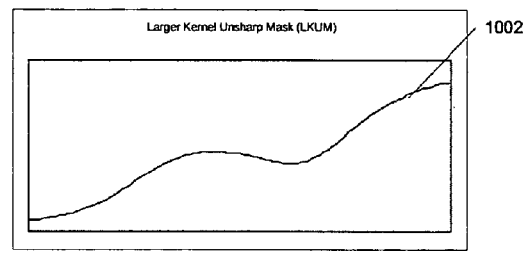
FIG. 11D is a diagram illustrating a curve representing another unsharp mask generated from the image data of FIG. 11A.
Figure 11C:
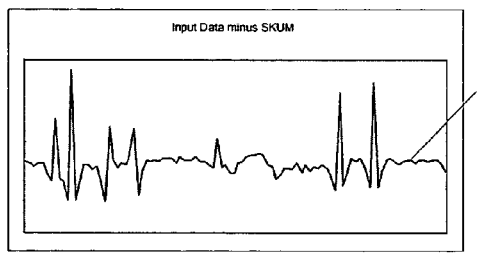
FIG. 11C is a diagram illustrating a curve representing the amplified difference between the curve of FIG. 11A and the curve of FIG. 11B.

FIGS. 11A-11F illustrate an example of using two different unsharp masks with different cutoff frequencies, such as those depicted in relation to FIGS. 9 and 10, to produce enhanced output signals in accordance with one embodiment of the systems and methods described herein. In the examples of FIGS. 11A-11F, input curve 902 is a simple one-dimensional data set; however, it will be easily understood that the same techniques can be applied to an n-dimensional system. FIG. 11A, therefore, illustrates an input data curve 902. FIG. 11B illustrates an unsharp mask 904 that results from applying a relatively small kernel filter with a relatively high cutoff frequency. FIG. 11C illustrates a curve 906 that is the result of subtracting unsharp mask 904 from input data curve 902. The result of subtraction can then be amplified or resealed as explained above.

Figure 11E:
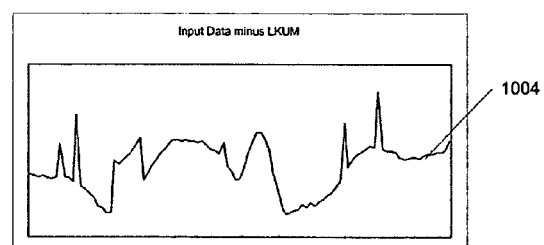
FIG. 11E is a diagram illustrating a curve representing the amplified difference between the curve of FIG. 11A and the curve of FIG. 11D.

FIG. 11D illustrates an output curve 1002 representing an unsharp mask resulting from the application of a relatively large kernel filter, i.e., a low pass filter with a relatively low cutoff frequency, to input data curve 902. It should be apparent, as explained above, that unsharp mask 1002, is generally "smoother" than curve 904. FIG. 11E illustrates a curve 1004 representing amplified pixel values resulting from the subtraction of unsharp mask 1002 from input data curve 902.

Figure 11F:
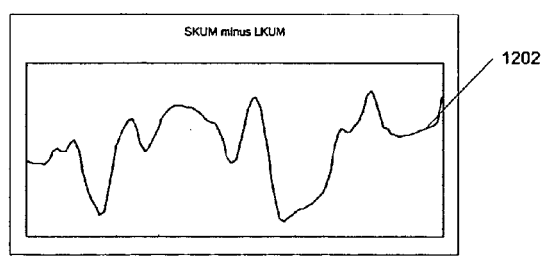
FIG. 11F is a diagram illustrating a curve representing the amplified difference between the curve of FIG. 11B and the curve of FIG. 11D.

FIG. 11F illustrates a curve 1202, which is the result of subtracting the unsharp mask 1002 from unsharp mask 904.

Curves 904 and 906 can be regarded as a pair of low and high frequency bands of a simple two-band video graphic equalizer, respectively. Similarly, curves 1002 and 1004 can also be regarded as another pair of low and high frequency bands of a simple two-band video graphic equalizer, respectively, but with a cutoff frequency different from that of curves 902 and 904. Curve 1202 can then be regarded as a mid band, e.g., of a somewhat more sophisticated video graphic equalizer. By using two different unsharp masks with different cutoff frequencies, a three-band video graphic equalizer can, therefore, be formed with a low band, e.g., curve 1002, a mid band, e.g., 1202, and a high band, e.g., curve 906. These bands can be relatively contiguous and non-overlapping.

Video graphic equalizers with larger numbers of bands can also be formed by the application of combinations of larger numbers of unsharp masks formed with suitable different cutoff frequencies, in a manner similar to that described above.

As mentioned above, the filtering, decimation, and re-interpolation systems and methods described above can provide enhanced video in a wide variety of applications including, medical, industrial, military and law enforcement, and consumer entertainment applications. Moreover, since the filters, decimators, and interpolators described above reduce the processing and storage requirements with respect to traditional methods, the filtering, decimation, and interpolation circuits can be included in small form factor chip sets or even a single Application Specific Integrated Circuit (ASIC), which helps to enable an even wider variety of applications.

Figure 12:
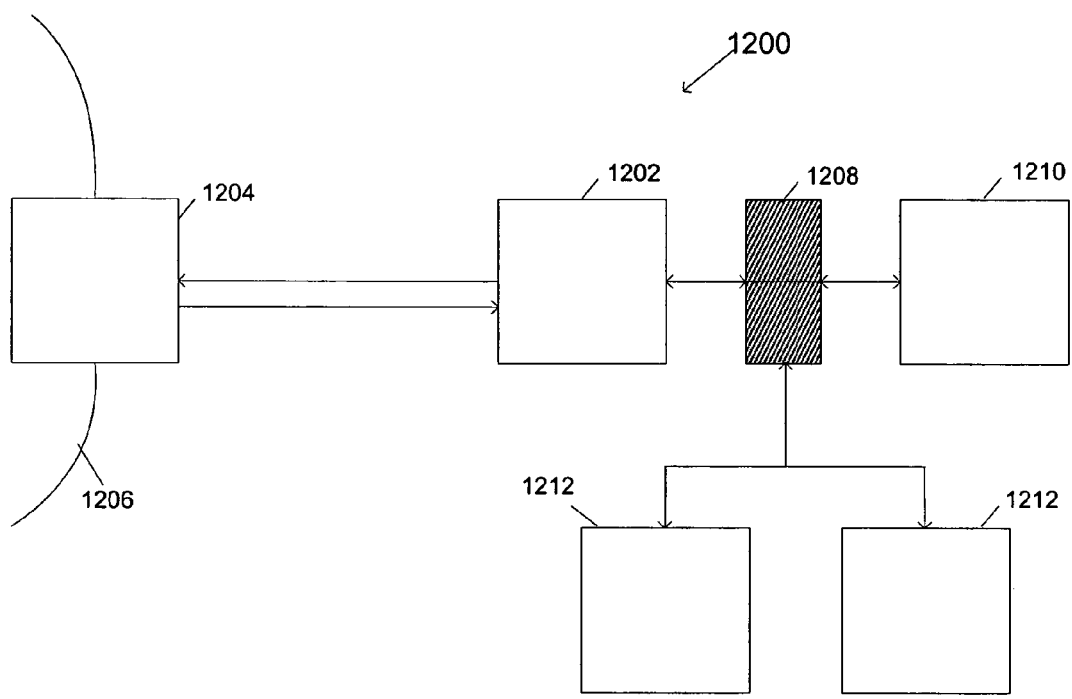
FIG. 12 is a diagram illustrating an exemplary cable system comprising a video enhancement device configured in accordance with one embodiment of the invention.

For example FIG. 12 illustrates a typical cable system 1200 configured to deliver cable television program to a consumer's cable set top box 1202. The cable television programming can, for example, comprise NTSC or HDTV cable television signals. The cable network 1206 can comprise a head-end 1204 that is configured to receive television programming and deliver it to a particular consumers set top box 1202. Set top box 1202 can be configured to then delver the television programming for viewing via the consumer's television, or display, 1210.

In system 1200, however, a video enhancement device 1208 can be included to enhance the cable television programming being delivered in accordance with the systems and methods described above. In other words, video enhancement device 1208 can be configured to perform the filtering, decimation, interpolation, and further processing steps described above.

Thus, the cable television programming delivered to television 1210 for viewing can be significantly enhanced, even if the television programming comprises HDTV signals. Moreover, a user can be allowed to select the types of enhancement desired, e.g., using a multiple band graphic equalizer configured from a plurality of unsharp masks as described above.

Further, other video generation devices 1212 can be interfaced with video enhancement device 1208. Exemplary video generation devices 1212 can include, for example, a DVD player, a digital video camera, or a VCR. Thus, the video signals displayed via television 1210 can be enhanced regardless of the source, simply by routing them through video enhancement device 1208. Alternatively, signals from video generation devices 1210 can be routed through set top box 1202 to video enhancement device 1208.

Moreover, because the circuits comprising video enhancement device 1208 can be made very small using today's circuit fabrication techniques, video enhancement device 1208 can actually be included within one of the other components comprising system 1200. For example, video enhancement device 1208 can be included in head-end 1204 and delivered to television 1210 via set top box 1202. Alternatively, video enhancement device 1202 can be included in set top box 1202 or television 1210. Video enhancement device 1208 can even be included in video generation devices 1212.

Thus, the ability afforded by the efficiency of implementation of the systems and methods described herein to miniaturize the circuits comprising video enhancement device 1208 provides flexibility in the enhancement and design of various consumer electronics and entertainment devices. The same flexibility can also be afforded to more specialized implementations, such as medical imaging, military target acquisition, and/or military or law enforcement surveillance systems.

Various filtering techniques can be used to implement the systems and methods described above. These techniques can comprise analog and/or digital filtering techniques. Digital filtering techniques can be preferred, especially form the viewpoint of aiding integration with other circuits, e.g., into one or more ASICs.

In working with multi-dimensional image data sets which additionally comprise a time sequence of images, e.g., images of the same or similar scene content captured at a plurality of times, it is often desirable to filter such data in the temporal dimension, e.g. to reduce noise of other unwanted temporal variations that may be present in the data. If there is a very little motion or other change in the data from one image to the next, such filtering can be quite beneficial as another means of enhancing the image data. For this purpose, low pass temporal filtering can be done by simply averaging a number of frames together, but typically an exponential, or first order, infinite response (IIR) filter is used due to its ease of implementation.

It will be understood that using higher order filters can perform better than a first order filter. This is especially true when large changes in the spectral content of the data need to be detected. For example, in video imaging systems, it can be important to detect when there is a relatively large changes, or motion, in the data. If relatively heavy filtering is being applied when there is a lot of motion, then blurring, or artifacts, can result from the filtering operation. Thus, it can be preferable to detect when there is a lot of motion and then turn down the amount of filtering that is being applied.

It will be understood that, in general, using higher order IIR filters can perform better than a first order filter. This can be especially true when filtering in the temporal domain, and large changes in the content of the data need to be detected. For example, in video imaging systems, it can be important to detect when there is a relatively large changes, or motion, in the data. If relatively heavy filtering is being applied when there is a lot of motion, then blurring, or artifacts, can result from the filtering operation. Thus, it can be preferable to detect when there is a lot of motion and then, for example, turn down the amount of filtering that is being applied, or compensate for the motion or changes in some other way.

With a first order filter, a temporal low pass version of the data will be available, but the low pass version by itself is not very useful for detecting motion. A temporal high pass version of the data can be obtained by subtracting the low pass version from the original data. The high pass version can be used to detect changes in the image, e.g. movement; however, this technique is susceptible to false indications due to noise. In other words, noise can masquerade as motion and limit the systems ability to adequately detect when in fact there is motion. Conventional higher order digital filters are typically built using delay taps, but other than the low pass output of the filter having higher order characteristics, all that is produced from these additional taps is delayed versions of the data, which is not necessarily useful, e.g., for detecting motion.

In order, for example, to better detect motion, the systems and methods described herein can make use of a higher order temporal digital IIR filter, e.g. a second order filter, that is configured to generate more useful additional information, e.g. a temporal high pass, band pass, and low pass version of the data. The temporal band pass version of the data can then be used, for example, as an indicator of motion or other changes in the image. The band pass version can be used to more accurately detect motion, because changes in the data that are persistent over a few frames are more likely to be motion as opposed to a noise spike. Thus, a higher order temporal filter, such as a digital state variable filter can be used to generate a high pass, band pass, and low pass version of the data. The band pass version can then be used, for example to detect motion. The amount of filtering can then be modulated based on the amount of motion detected either on a global image bases or, more effectively in a locally adaptive fashion, e.g. by considering the amplitude of the temporal band pass term at each point in the image and modifying the characteristics of the filter on a pixel by pixel basis. Alternatively, other actions to compensate for motion or other changes in the image can be taken based on indicators involving the band pass data. In addition, implementation of a higher order digital state variable filter can have other advantages over the simpler traditional delay-tap-based methods.

These include such items as being more efficient in implementation, especially for heavy filtering (i.e. relatively low cutoff frequencies), being less susceptible to truncation and limit cycle behavior. Also, the higher order impulse response profile (which approaches Gaussian shape) can provide somewhat heavier filtering (noise reduction) efficacy with less apparent total motion blur, and more symmetrical blurring for moving objects, than does the trailing "Superman's cape" effect for moving objects with traditional temporal noise reduction implementation which is common due to the characteristic long, slowly decaying exponential tail of the first order filter profile.

Accordingly, not only can the systems and methods described herein provided better enhancement, it can also reduce artifacts, or blurring when there is significant motion in the data. It should also be noted that the band pass version of the data can also be used for other beneficial purposes. For example, the band pass information can be combined with the high pass, or low pass data to detect other useful information about the data.

In image processing operations, such as those described above, filtering operations with a large kernel size is applied to an image such that, when processing a given pixel, the algorithm uses the pixel values of the surrounding pixels within the boundary defined by the size of the kernel. In general, when processing pixels near the edge of a data set, such as the edge of a television image frame, the kernel would extend past the edge and some assumption must be applied to the pixel values in the area outside the data set. This is because the pixel values outside the data set contribute to and will most likely contaminate or corrupt the processing of a pixel near the edge of, but still within, the active data area of a data set such as a television image frame.

In rasterized images such as a conventional television system, the raster format naturally provides "space" for at least some amount of this extra border area, also called blanking intervals, for system processing in real time. Mechanisms for filtering such images in real time typically keep the filtering process going during these blanking intervals without much additional burden on the processing power; however, the existence of blanking intervals between active image areas of rasterized images does not generally mean that suitable pixel values are provided for use within the blanking intervals, thereby resulting in artifacts near the edges of the active areas.

Furthermore, in HDTV systems for example, the vertical blanking area between adjacent image frames is considerably smaller in proportion to the active image area than in a conventional television system, and therefore is more likely to be smaller than the size of the kernel in large kernel processing operations. Thus, for a given pixel near the edge of a given frame, a large kernel size means that a significant portion of the kernel will be outside the frame and can even include pixels in an adjacent frame, which will be from a different area of the image.

The systems and methods described herein can account for, and reduce the effect of blanking areas on the large kernel processing of pixel data. When pixels comprising a blanking area are processed using the systems and methods described herein, additional blanking data can be added to the blanking area such that the additional "fictional blanking area" will occupy an area within the kernel size instead of image data in the adjacent frame, aided, for example, by the availability of additional processing power achieved by multi-dimensional filtering, decimation, or sub-sampling, and data processing operations as described above.

The addition of fictional blanking area to the small existing vertical or horizontal blanking area between adjacent frames in, for example, an HDTV system can be achieved by speeding up the pixel clock during a blanking interval. For example, in an HDTV system, the vertical blanking area is of special concern. The pixel data is coming at a certain rate and is processed at rate dictated by the rate the pixel data is being provided. But during a blanking interval, there is no data so the system can be allowed to speed up the pixel clock, i.e., act like pixel data is coming much faster. Thus, the data in the blanking area can be made to appear like more pixel data, thus creating fictional blanking data.

With the addition of the fictional scan lines, the pixels near a horizontal edge of a given frame of, e.g., an HDTV image can be processed without contamination by data values of the pixels near the opposite edge of the adjacent frame, which would otherwise undesirably affect the large-kernel filtering operations on the pixels near the edge of the frame currently being processed. The process of filling in intelligent pixel values in the blanking area, including the naturally existing blanking area and the artificially added fictional scan lines, is dependent on the requirements of a particular implementation and can be optimized for various types of signals and blanking area sizes.

In one embodiment, a feedback loop can be connected during blanking time to the horizontal and vertical filters for two-dimensional video processing, such that after each iteration, the blanking area including the actual blanking area and the fictional scan lines is filled up progressively with more appropriately assumed data. After multiple iterations, the blanking area is filled up with artificial data resulting from the feedback loop in the circuit, such that the transition from the edge of a given frame to the blanking area, including the artificially added fictional blanking data, and from the blanking area to the edge of the immediately adjacent frame will be a smooth transition. The artificial data assigned to the blanking area will be used as inputs in the filtering or processing of the pixel near the edge of the frame.

The amount of fictional blanking data added is dependent on the specific implementation. Generally, however, it is sufficient to simply add enough fictional blanking data such that overlap of adjacent frames is sure to be avoided.

Figure 13:
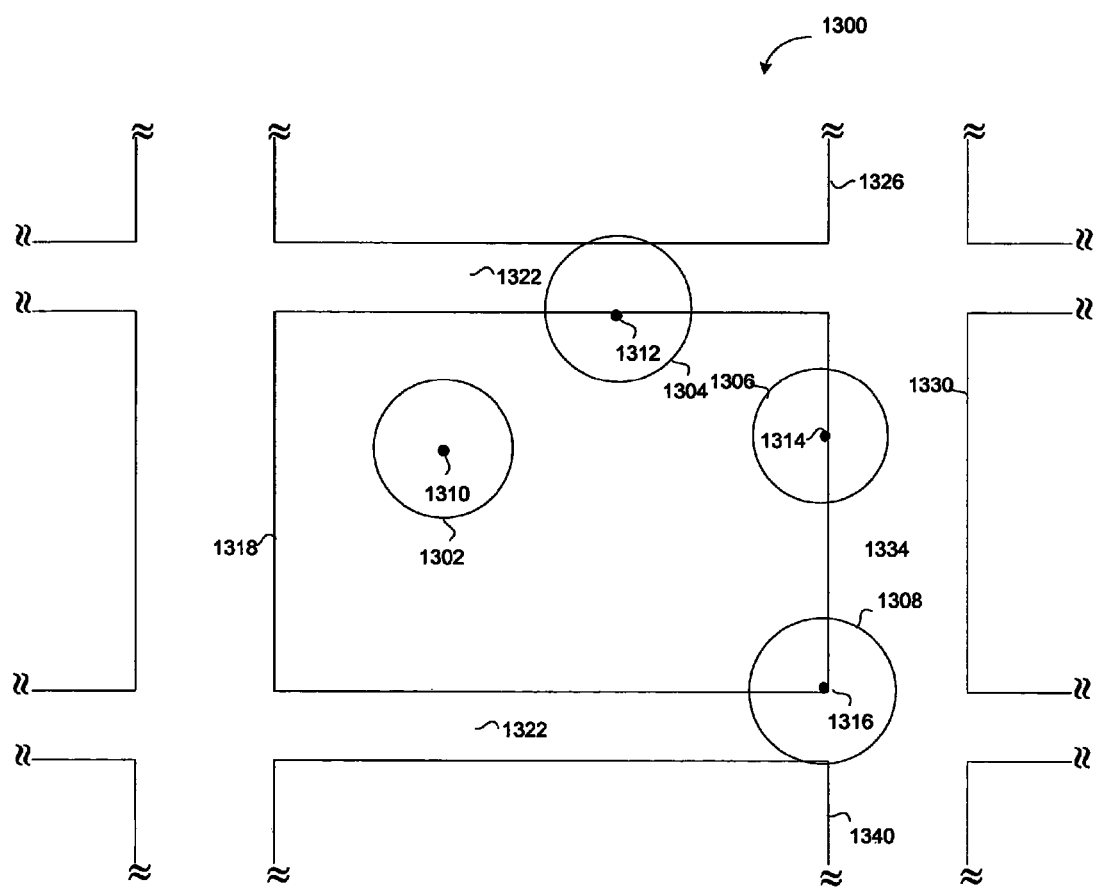
FIG. 13 is a diagram illustrating an exemplary NTSC video image display.

FIG. 13 illustrates an example of a traditional NTSC display 1300. Various pixels 1310, 1312, 1314, and 1316, within a current frame 1318 are highlighted along with the associated processing kernel sizes 1302, 1304, 1306 and 1308, respectively. For pixel 1310, for example, associated kernel 1302 is completely inside frame 1318. Thus, the pixel values from the adjacent frames would not likely cause significant contamination of the filtering, decimation, and/or other types of processing operations performed on pixel 1310. Pixel 1312, which is at or near the upper horizontal edge of frame 1318, however, has an associated kernel size 1304 that includes a portion of vertical blanking area 1322 and a small image area within adjacent frame 1326. Thus, the processing of pixel 1312 can be affected by the values applied to the portion of blanking area 1322 that falls within kernel size 1304. The pixel values from adjacent frame 1326 can cause even further issues with the processing of pixel 1312, because these pixel values are usually unrelated to, and can be quite different from, pixel 1312, thereby causing undesirably noticeable artifacts. Considering that disparate motion can exist between different areas of adjacent frames, the lack of relationship between the pixels in the adjacent frame and the pixel that is being processed can potentially cause even more noticeable artifacts.

For pixel 1314 at or near the right vertical edge of frame 1318, the size of associated kernel 1306 is not large enough, in the example of FIG. 13, to overlap any image area of horizontally adjacent frame 1330. Therefore, pixel 1314 can be processed without substantial contamination from the data values in adjacent image frame 1330; however, even without contamination by pixel values of adjacent frame 1330, suitable values should still be assigned to the portion of blanking area 1334 within kernel size 1306 in order to avoid artifacts relating to the blanking area.

For a pixel 1316 at or near a corner of frame 1318, corresponding kernel 1308 can include a significant portions of blanking area 1334 and an area near the corner of vertically adjacent frame 1340. As mentioned, the overlapping area in adjacent frame 1340 can contribute directly to the processed value of pixel 1316. In addition, the pixel values of other image areas outside kernel area 1308 in adjacent frame 1340 can also indirectly impact the processing of pixel 1316, because they can affect the values filled into blanking area 1334.

In one embodiment, a range of values are determined for pixel values comprising a blanking area, some of which will then fall within the area of a kernel, such as kernel area 1304 or kernel area 1306. The values can be determined on an implementation by implementation basis, or default values can be provided, depending on the requirements of a particular implementation, in order to provide a slow, smooth data transition across the blanking area between the data in adjacent frames. It should be noted that the values in the blanking area can still be affected somewhat by the pixel values in adjacent frames. The values in the blanking area closer to the adjacent frames can be affected by the pixel values in the adjacent frames to a greater degree, but these values can be assigned smaller coefficients, and therefore not cause a great amount of impact on the filtering result.

As mentioned, in order to limit the effects of pixels in adjacent frames 1326, 1330, and 1340 on the processing of pixels 1312, 1314, and 1316, fictional blanking data can be added to blanking area 1322 and 1334, e.g., by speeding up the pixel clock during the blanking periods. Values can then be assigned to the blanking areas, as described, including the fictional blanking data. Adding fictional blanking data can keep kernel areas 1304, 1306, and 1308 from overlapping pixels in adjacent frames 1326, 1330, and 1340, or at least reduce the extent to which there is overlap. The reduction in overlap can prevent pixels in adjacent frames 1326, 1330, and 1340 from having any significant effect on the processing of, e.g., pixels 1312, 1314, and 1316.

Figure 14:
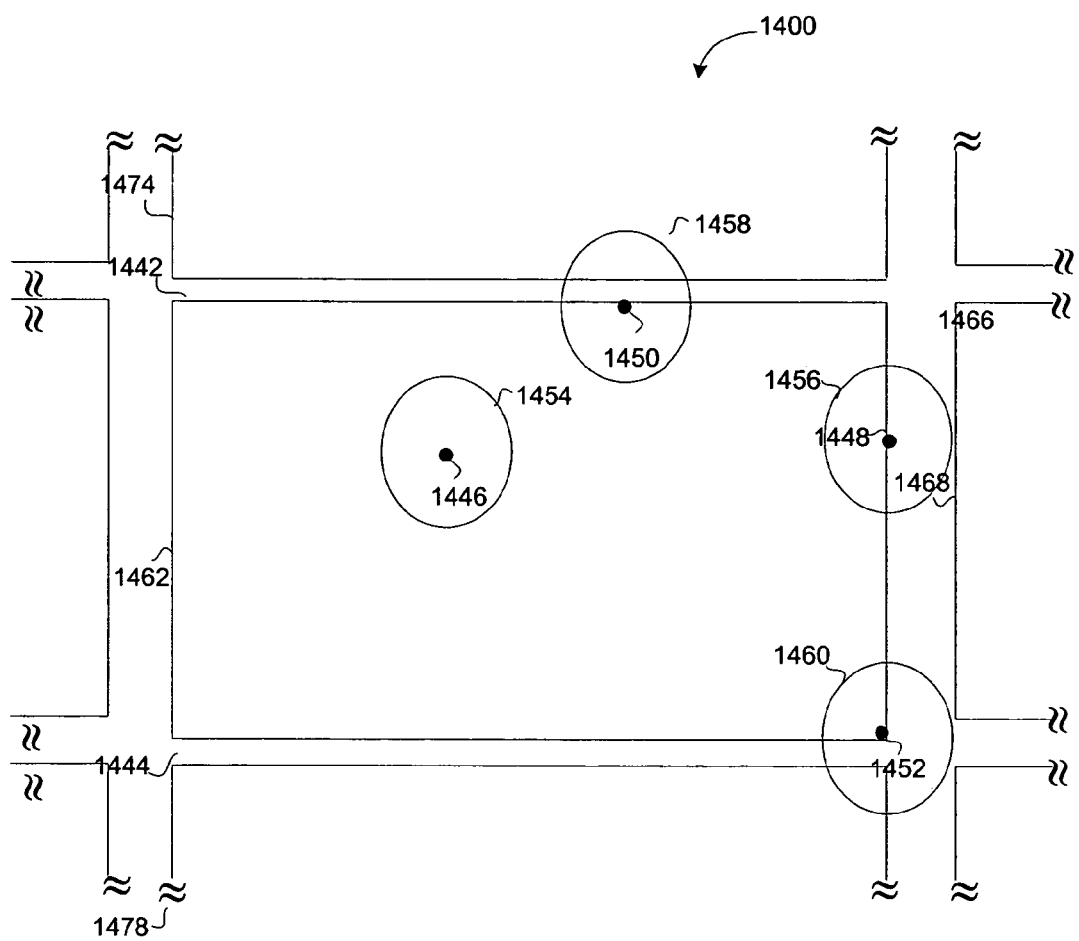
FIG. 14 is a diagram illustrating an exemplary HDTV video image display.

As mentioned, due to the smaller blanking areas present in HDTV signals, pixels in adjacent frames are even more of a concern. FIG. 14 illustrates an example of an HDTV display. Representative pixels 1446, 1448, 1450, and 1452 are shown with associated kernel sizes 1454, 1456, 1458, and 1460. The processing of pixel 1446 is not likely to be significantly affected by the pixel values of adjacent frames because kernel 1454 is completely within frame 1462. For pixel 1448 at or near the right vertical edge of frame 1462, however, kernel 1456 includes a portion of blanking area 1456 between frame 1462 and horizontally adjacent frame 1468. But because horizontal blanking area 1456 between HDTV image frames is relatively large compared to the typical kernel size for filtering operations, the processing of pixel 1448 is not likely to be substantially contaminated by the pixel values in horizontally adjacent frame 1468. Suitable gray values should, however, still be formulated and filled into blanking area 1456, as described above, in order to avoid artifacts relating to the blanking area. Further, since the gray values in blanking area 1456 can still be affected by the pixel values in adjacent frame 1468 at least to some extent, the processing of pixel 1448 can still be indirectly affected by the pixel values in adjacent frame 1468.

For pixel 1450 at or near the upper horizontal edge of frame 1462, a significant portion of vertically adjacent frame 1474 can reside within kernel 1458, because vertical blanking area 1442 between frames 1462 and 1474 is small compared to the typical kernel size for filtering and decimation operations in HDTV systems. Thus, the pixel values in frame 1474 of can significantly contaminate the processing of pixel 1450, thereby producing substantially noticeable artifacts. In addition to the contamination of gray values filled into the blanking area, the processing of pixel 1450 can be significantly affected by the actual pixel values in adjacent frame 1474, especially considering that these pixel values are most likely unrelated to, and can be quite different from, pixel 1450.

Similarly, kernel 1460 associated with pixel 1452 at or near the corner of frame 1462 can comprise a large area overlapping the corner portion of vertically adjacent frame 1478. The pixel values in the corner portion of vertically adjacent frame 1478 can, therefore, cause significant contamination to the processing of pixel 1452, thereby producing significant artifacts. Thus, the gray values assigned to blanking areas 1466 and 1444 can contaminate the processing of pixel 1452, and in addition, the pixel values in adjacent frame 1478 can significantly exacerbate the contamination of the processing of the pixel 1452.

The addition of fictional scan lines, especially to the vertical blanking areas between vertically adjacent image frames in an HDTV system, can eliminate, or at least significantly reduce, the amount of overlap between, e.g., kernels 1454, 1456, and 1458 and adjacent frames 1474, 1444, and 1468, thereby avoiding, or at least mitigating, the contamination of data values of pixels 1446, 1448, and 1450.

Figure 15:
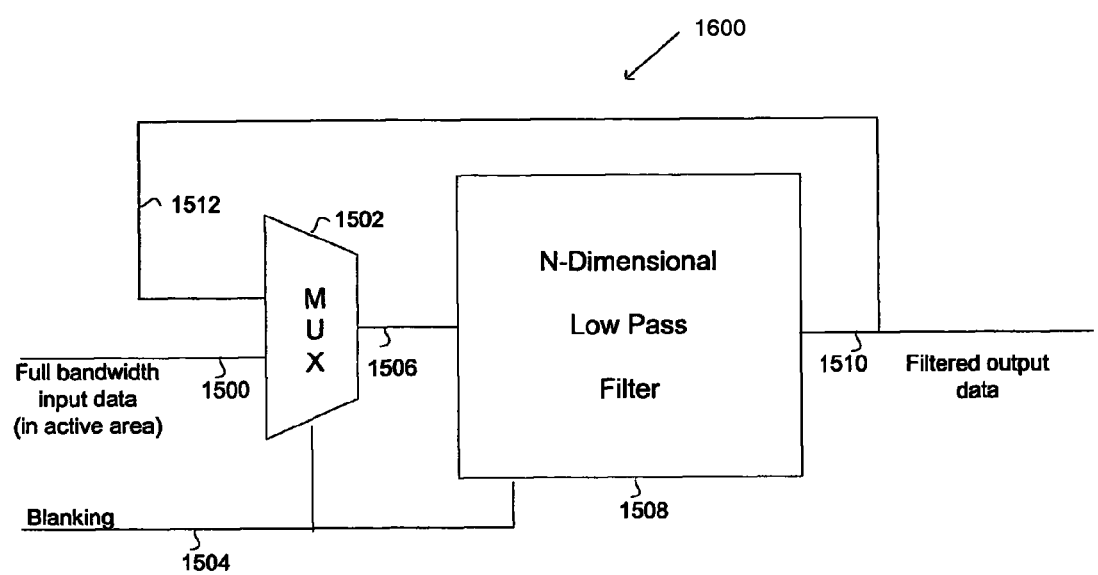
FIG. 15 is a diagram illustrating an example circuit for creating fictional blanking area in accordance with the systems and methods described herein.

FIG. 15 is a block diagram illustrating a circuit configured to insert fictional blanking data and associated values to blanking areas including the fictional blanking data in accordance with one embodiment of the systems and methods described herein. Full-bandwidth input data, e.g., the active video image of frame 1562, can be received at a first input 1500 of a video data multiplexer 1502, which can also be configured to receive a control signal 1504 that indicates when blanking occurs between adjacent frames. The original blanking data can initially be received on the same path as the input data, e.g. on input 1500, because the original blanking data is part of the original video data.

Multiplexer 1502 can be configured to pass the input data to a N-dimensional low pass filter 1508 configured to low pass filter the input date, e.g., as described above. The output of N-dimensional low pass filter 1508 can then be fed back to a feedback input 1512 of multiplexer 1502. Multiplexer 1502 can, therefore, be configured to multiplex, under the control of control signal 1504, the input data and the filtered output of N-dimensional low pass filter 1510. Thus, the output of N-dimensional low pass filter 1508 can be used to develop an estimate of the value that should be assigned to a blanking area.

Control signal 1504 can also be supplied to N-dimensional low pass filter 1508 to control pixel processing rate, i.e., effectively speed up the pixel clock, to thereby add the fictional blanking data. It should be noted that, for example, the decimation of data described above can be useful for freeing up processing resources that can then be used to perform more cycles, i.e., speed up the pixel clock. The initial value of the fictional blanking data can also be initially set to a zero value and then filled in using estimates based on the filtered output of N-dimensional low pass filter 1508.

Thus, the blanking lines can be progressively filled with data values after a number of iterations of low pass filtering through N-dimensional low pass filter 1508, until a smooth transitions is formed between the actual data values of the pixels near the edges of adjacent frames and the artificial data values filled into the blanking areas, including the fictional scan lines added to the blanking area.

In certain embodiments, N-dimensional low pass filter can, for example, be a two-dimensional low pass filter comprising separable horizontal and vertical low pass filters. But as mentioned, the systems and methods described herein can be applied in N-dimensions.

Thus, circuit 1500 can be included in the same device, e.g. video enhancement device 1208, or even ASIC, as the circuits described above. Alternatively, some or all of the circuits can be included in different devices and/or ASICs. Further, by implementing the systems and method described herein significant enhancement in video imagery for a variety of systems can be achieved.

While certain embodiments of the inventions have been described above, it will be understood that the embodiments described are by way of example only. Accordingly, the inventions should not be limited based on the described embodiments. Rather, the scope of the inventions described herein should only be limited in light of the claims that follow when taken in conjunction with the above description and accompanying drawings.

The invention claimed is:

1. A method for enhancing multi-dimensional image data, comprising:
    scanning image data in a plurality of dimensions;
    first, performing the following steps for a first dimension of the plurality of dimensions:
        applying a first-dimension low pass filter to image data contained in the first dimension to generate a first-dimension filtered output, the first low pass filter having a, plurality of predetermined filter coefficients;
        delaying the image data contained in the first dimension using at least one first-dimension delay buffer;
        outputting at least one set of first-dimension buffer-delayed image data;
        applying at least one additional first-dimension low pass filter to said at least one set of first-dimension buffer-delayed image data to generate at least one additional first-dimension filtered output, said at least one additional first-dimension low pass filter having a plurality of predetermined filter coefficients; and
        accumulating the first-dimension filtered output and said at least one additional first-dimension filtered output to generate one-dimensional decimated image data; and
    second, performing he following steps for a second dimension of the plurality of dimensions:
        applying a second-dimension low pass filter to the one-dimensional decimated image data to generate a second-dimension filtered output, the second low pass filter having a plurality of predetermined filter coefficients;
        delaying the one-dimensional decimated image data by at least one second-dimension delay buffer;
        outputting at least one set of second-dimension buffer-delayed image data;
        applying at least one additional second-dimension low pass filter to said at least one set of second-dimension buffer-delayed image data to generate at least one additional second-dimension filtered output, said at least one additional second-dimension low pass filter having a plurality of predetermined filter coefficients; and
        accumulating the second-dimension filtered output and said at least one additional second-dimension filtered output to generate two-dimensional decimated image data.

2. The method of claim 1, wherein each of the low pass filters comprises a finite impulse response (FIR) filter.

3. The method of claim 1, wherein applying the first-dimension low pass filter comprises multiplexing the plurality of predetermined filter coefficients for the first-dimension low pass filter to generate a multiplexed coefficient output.

4. The method of claim 3, wherein applying the first-dimension low pass filter further comprises multiplying the multiplexed coefficient output with the image data to generate the first-dimension filtered output.

5. The method of claim 1, wherein applying said at least one additional first-dimension low pass filter comprises multiplexing the plurality of predetermined filter coefficients for said at least one additional first-dimension low pass filter to generate a multiplexed coefficient output.

6. The method of claim 5, wherein applying said at least one additional first-dimension low pass filter further comprises multiplying the multiplexed coefficient output with said at least one set of first-dimension buffer-delayed image data to generate said at least one additional first-dimension filtered output.

7. The method of claim 1, wherein applying the second-dimension low pass filter comprises multiplexing the plurality of predetermined filter coefficients for the second-dimension low pass filter to generate a multiplexed coefficient output.

8. The method of claim 7, wherein applying the second-dimension low pass filter further comprises multiplying the multiplexed coefficient output with the one-dimensional decimated image data to generate the second-dimension filtered output.

9. The method of claim 1, wherein applying said at least one additional second-dimension low pass filter comprises multiplexing the plurality of predetermined filter coefficients for said at least one additional second-dimension low pass filter to generate a multiplexed coefficient output.

10. The method of claim 9, wherein applying said at least one additional second-dimension low pass filter further comprises multiplying the multiplexed coefficient output with said at least one set of second-dimension buffer-delayed image data to generate said at least one additional second-dimension filtered output.

11. The method of claim 1, further comprising:
    third, performing the following steps for a third dimension of the plurality of dimensions:
        applying a third-dimension low pass filter to the two-dimensional decimated image data in the third dimension to generate a third-dimension filtered output, the third-dimension low pass filter having a plurality of predetermined filter coefficients;
        delaying the two-dimensional decimated image data by at least one third-dimension delay buffer outputting at least one set of third-dimension buffer-delayed image data;
        applying at least one additional third-dimension low pass filter to said at least one set of third-dimension buffer-delayed image data to generate at least one additional third-dimension filtered output, said at least one additional third-dimension low pass filter having a plurality of predetermined filter coefficients; and accumulating the third-dimension filtered output and said at least one additional third-dimension filtered output to generate three-dimensional decimated image data.

12. The method of claim 11, wherein each of the low pass filters comprises a finite impulse response (FIR) filter.

13. The method of claim 11, wherein applying the third-dimension low pass filter comprises multiplexing the plurality of predetermined filter coefficients for the third-dimension low pass filter to generate a multiplexed coefficient output.

14. The method of claim 13, wherein applying the third-dimension low pass filter further comprises multiplying the multiplexed coefficient output with the two-dimensional decimated image data to generate the third-dimension filtered output.

15. The method of claim 11, wherein applying said at least one additional third-dimension low pass filter comprises multiplexing the plurality of predetermined filter coefficients for said at least one additional third-dimension low pass filter to generate a multiplexed coefficient output.

16. The method of claim 15, wherein applying said at least one additional third-dimension low pass filter further comprises multiplying the multiplexed coefficient output with said at least one set of third-dimension buffer-delayed image data to generate said at least one additional third-dimension filtered output.

* * * * *